United States Patent
Zhang et al.

(10) Patent No.: US 12,446,097 B2
(45) Date of Patent: Oct. 14, 2025

(54) TECHNIQUES FOR MANAGING SESSIONS IN MULTIPLE-SUBSCRIPTION WIRELESS COMMUNICATIONS

(71) Applicant: QUALCOMM Incorporated, San Diego, CA (US)

(72) Inventors: Juan Zhang, Beijing (CN); Gavin Bernard Horn, La Jolla, CA (US); Ozcan Ozturk, San Diego, CA (US); Haris Zisimopoulos, London (GB); Hao Xu, Beijing (CN); Huichun Liu, Beijing (CN); Peng Cheng, Beijing (CN); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 17/595,546

(22) PCT Filed: May 25, 2020

(86) PCT No.: PCT/CN2020/092088
§ 371 (c)(1),
(2) Date: Nov. 18, 2021

(87) PCT Pub. No.: WO2020/253472
PCT Pub. Date: Dec. 24, 2020

(65) Prior Publication Data
US 2022/0256640 A1 Aug. 11, 2022

(30) Foreign Application Priority Data
Jun. 17, 2019 (WO) ................ PCT/CN2019/091514

(51) Int. Cl.
*H04W 76/27* (2018.01)
*H04L 67/146* (2022.01)
*H04W 68/00* (2009.01)

(52) U.S. Cl.
CPC .......... *H04W 76/27* (2018.02); *H04L 67/146* (2013.01); *H04W 68/005* (2013.01)

(58) Field of Classification Search
None
See application file for complete search history.

(56) References Cited

U.S. PATENT DOCUMENTS 8,934,336 B2   1/2015  Ramachandran et al.
11,463,979 B2 * 10/2022  Youn .................. H04W 60/005
(Continued)

FOREIGN PATENT DOCUMENTS

CN   104581992 A   4/2015
CN   106416305 A   2/2017
(Continued)

OTHER PUBLICATIONS

International Search Report and Written Opinion—PCT/CN2020/092088—ISA/EPO—Aug. 24, 2020.
(Continued)

*Primary Examiner* — Charles N Appiah
*Assistant Examiner* — Frank E Donado
(74) *Attorney, Agent, or Firm* — Arent Fox, LLP

(57) ABSTRACT

Aspects described herein relate to requesting suspending of a data session of a first when a device capable of communicating over multiple subscriptions switches from an active communication state if the first network to an active communication state in a second network. The device can also request resuming the data session based on switching back to active communication state with the first network.

30 Claims, 8 Drawing Sheets

(56) References Cited

U.S. PATENT DOCUMENTS

| | | | |
|---|---|---|---|
| 2014/0003397 A1 | 1/2014 | Goyal et al. | |
| 2015/0181614 A1 | 6/2015 | Mitra et al. | |
| 2015/0327159 A1* | 11/2015 | Gude | H04W 48/18 |
| | | | 455/434 |
| 2017/0180550 A1 | 6/2017 | Geo et al. | |
| 2018/0042014 A1* | 2/2018 | Wu | H04W 88/06 |
| 2018/0160422 A1 | 6/2018 | Pathak et al. | |
| 2020/0053816 A1* | 2/2020 | Son | H04W 76/30 |
| 2020/0280836 A1* | 9/2020 | Velev | H04W 76/19 |
| 2020/0296638 A1* | 9/2020 | Tsai | H04W 36/0058 |
| 2022/0210756 A1* | 6/2022 | Kumar | H04W 76/15 |
| 2022/0240213 A1* | 7/2022 | Ly | H04W 60/04 |

FOREIGN PATENT DOCUMENTS

| | | |
|---|---|---|
| CN | 109474987 A | 3/2019 |
| WO | 2012125967 | 9/2012 |
| WO | 2013123343 A1 | 8/2013 |
| WO | 2016138937 A1 | 9/2016 |
| WO | 2019030727 A1 | 2/2019 |
| WO | 2019076439 A1 | 4/2019 |

OTHER PUBLICATIONS

International Search Report and Written Opinion—PCT/CN2019/091514—ISA/EPO—Mar. 10, 2020.

3GPP TS 23.502: "3rd Generation Partnership Project, Technical Specification Group Services and System Aspects, Procedures for the 5G System, Stage 2 (Release 16)", 3GPP Draft, 23502-G11_Correction_CRS_Implemented, 3rd Generation Partnership Project (3GPP), Mobile Competence Centre, 650, Route Des Lucioles, F-06921 Sophia-Antipolis Cedex, France, vol. SA WG2, V16.1.1, Jun. 11, 2019, 493 Pages, XP051756424, p. 145 under 2, p. 145, figures 4.8.1.2-1.

3GPP TS 36.300: "3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2 (Release 15)", Draft_36300-F60, 3rd Generation Partnership Project (3GPP), Mobile Competence Centre, 650, Route Des Lucioles, F-06921 Sophia-Antipolis Cedex, France vol. RAN WG2, V15.6.0, Jun. 11, 2019, XP051751325, p. 91, figures 7.3a.3-1.

3GPP TS 38.331: "3rd Generation Partnership Project, Technical Specification Group Radio Access Network, NR, Radio Resource Control (RRC) Protocol Specification (Release 15)", 3rd Generation Partnership Project (3GPP), Mobile Competence Centre, 650, Route Des Lucioles, F-06921 Sophia-Antipolis Cedex, France, vol. RAN WG2, No. V15.5.1, Apr. 16, 2019, pp. 1-491, XP051723500, 489 Pages, p. 21, figures 4.2.1-1, p. 35, line 1-line 3, p. 60-p. 61, p. 21, figures 4.2.1-2.

Supplementary European Search Report—EP20826373—Search Authority—Berlin—May 22, 2023.

* cited by examiner

TECHNIQUES FOR MANAGING SESSIONS IN MULTIPLE-SUBSCRIPTION WIRELESS COMMUNICATIONS

This application is a 35 U.S.C. § 371 National Phase of International Patent Application No. PCT/CN2020/092088, entitled "TECHNIQUES FOR MANAGING SESSIONS IN MULTIPLE-SUBSCRIPTION WIRELESS COMMUNICATIONS" and filed May 25, 2020, which claims priority to International Patent Application No. PCT/CN2019/091514, entitled "TECHNIQUES FOR MANAGING SESSIONS IN MULTIPLE-SUBSCRIPTION WIRELESS COMMUNICATIONS" and filed Jun. 17, 2019, which is assigned to the assignee hereof, and incorporated herein by reference in its entirety.

BACKGROUND

Aspects of the present disclosure relate generally to wireless communication systems, and more particularly, to managing underlying data sessions.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some examples of wireless communications, a user equipment (UE) or other device can operate using multiple subscriptions, which can include operating using multiple physical subscriber identity modules (SIMS, or universal SIMs (USIMs)). The UE can communicate with a first network based on a first USIM in a connected mode, and can periodically attempt to receive signals (e.g., paging signals) from a second network based on a second USIM. The UE can enter connected mode in the second network based on a received signal.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes communicating with a first network based on a first subscription, receiving at least one signal from a second network based on a second subscription during a measurement time period defined by the first network, determining, based on receiving the at least one signal from the second network, to transition to an active communication state on the second subscription, and transmitting, to the first network and based on determining to transition to the active communication state on the second subscription, a suspend request to suspend a data session.

In another example, a method for wireless communication is provided that includes receiving, from a user equipment (UE) or a downstream network node, a suspend request to suspend a data session for the UE, determining an upstream network node serving the data session for the UE, and transmitting, to the upstream network node, a session suspend request to suspend the data session for the UE.

In another example, a method for wireless communication is provided that includes receiving, from a downstream network node serving a UE, a session suspend request to suspend a data session, where the session suspend request includes an indication to stop following downlink data transmissions for the data session, refraining from sending downlink data notifications to the downstream network node for the UE while the data session is suspended, and where the session suspend request does not include an indication to stop following downlink data transmissions for the data session, refraining from sending downlink data notifications to the downstream network node for the UE until expiration of a local timer.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
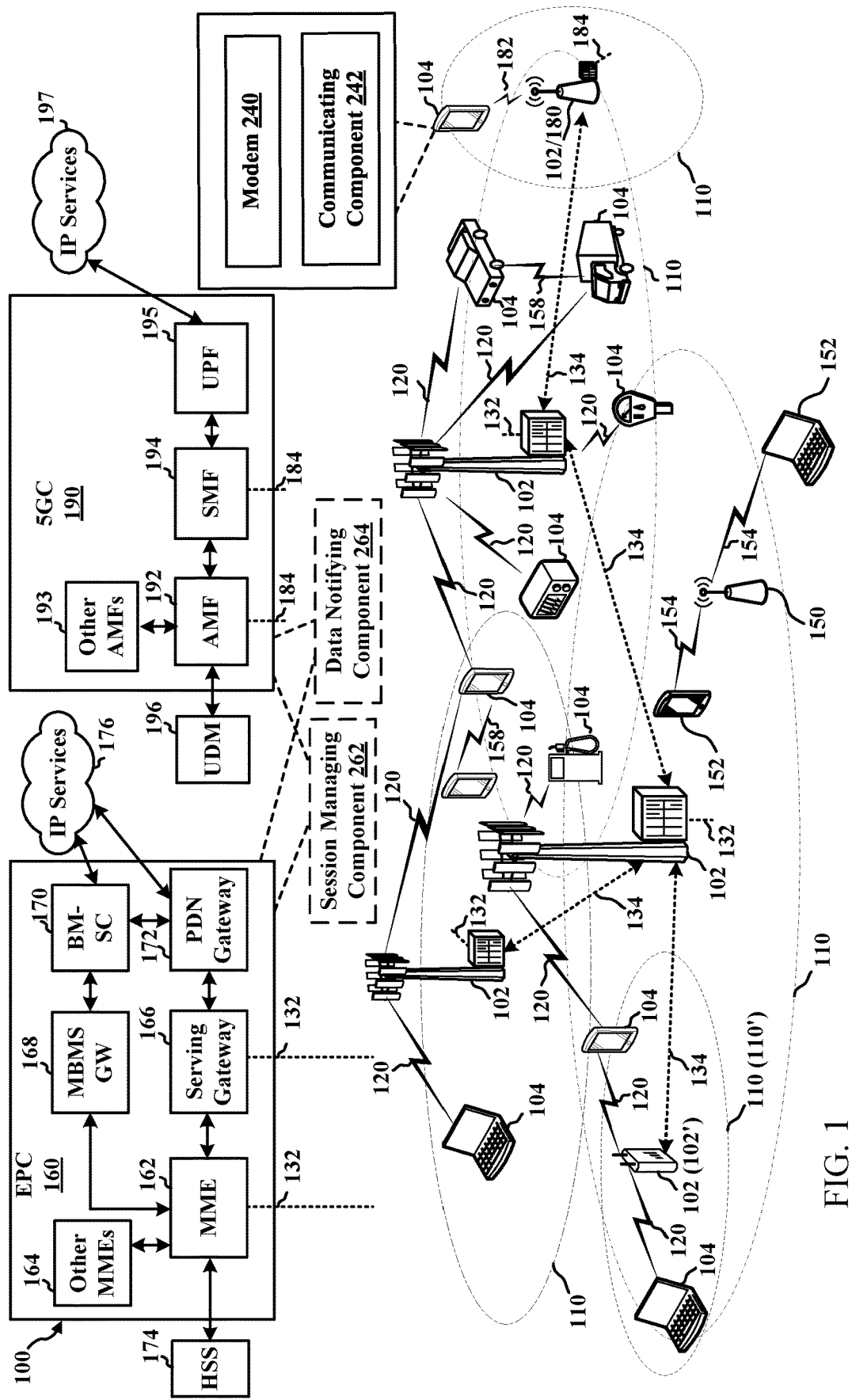
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to managing data sessions for multiple-subscription devices in wireless communications. In an example, a device capable of supporting multiple subscriptions can support communications with one of the multiple subscriptions at a time. In this example, the device communicating with a first network in a connected mode can suspend a data session with the first network based on determining to communicate with a second network in the connected mode. Similarly, the device can resume the data session based on determining to resume radio communications with the first network in the connected mode. Allowing the device to suspend the data session can help to ensure that the first network does not transmit data to the device when the device is communicating with the second network in connected mode, which can help to ensure the device does not miss data transmissions from the first network during this time.

In an example, a device communicating with the first network in a connected mode can determine to suspend the data session with the first network in determining to communicate with the second network in connected mode. In this example, the device can send a message to one or more network nodes of the first network to suspend the data session, and the message or a related message can be sent throughout the network to facilitate suspending the data session for the device. Suspending the data session may include stopping downlink signal transmission at certain nodes and/or stopping transfer of data to nodes that cause the downlink signal transmission. The device can communicate with the second network in the connected mode for a period of time, and then may determine to resume communications with the first network. In this example, (e.g., once the device establishes a connected mode radio connection with the first network) the device can send a message to the one or more network nodes of the first network to resume the data session. In addition, in one example, the subscriptions of the device may be associated with different universal subscriber identity modules (USIMs).

The described features will be presented in more detail below with reference to FIGS. 1-8.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for communicating with multiple networks using multiple subscription, and capable of requesting to suspend or resume a data session with a first network for transitioning to an active communication mode with a second network. In addition, some nodes and/or network functions may include a session managing component 262 for managing a data session for the UE 104 and/or a data notifying component 264 for notifying of data intended for the UE 104. Though a UE 104 is shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, a UE 104 can communicate with two or more different networks based on two or more different subscriptions. The networks may include a first network provided by EPC 160 or 5GC 190 via one or more base stations 102/180. When communicating in active communication mode (e.g., connected mode) with the first network, the UE 104 can attempt to receive signals, such as paging signals, on one or more other networks (e.g., during communication gaps configured by the first network). Where the UE 104 determines to transition to communicating with the second network (e.g., encountering a paging signal on a second network), the UE 104 can request, via communicating component 242, suspending of a data session with the first network. One or more components or functions of the first network, in conjunction with session managing component 262 and/or data notifying component 264, can suspend the data session for the UE 104 at the first network. The UE 104 can then transition to an active communication mode with the second network. After a period of time, the UE 104 may transition back to an active communication mode with the first network, and can request the data session at the first network be resumed. One or more components or functions of the first network, in conjunction with session managing component 262 and/or data notifying component 264, can resume the data session for the UE 104 at the first network.

Turning now to FIGS. 2-8, aspects are depicted with reference to one or more components and one or more methods that may perform the actions or operations described herein, where aspects in dashed line may be optional. Although the operations described below in FIGS. 3-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
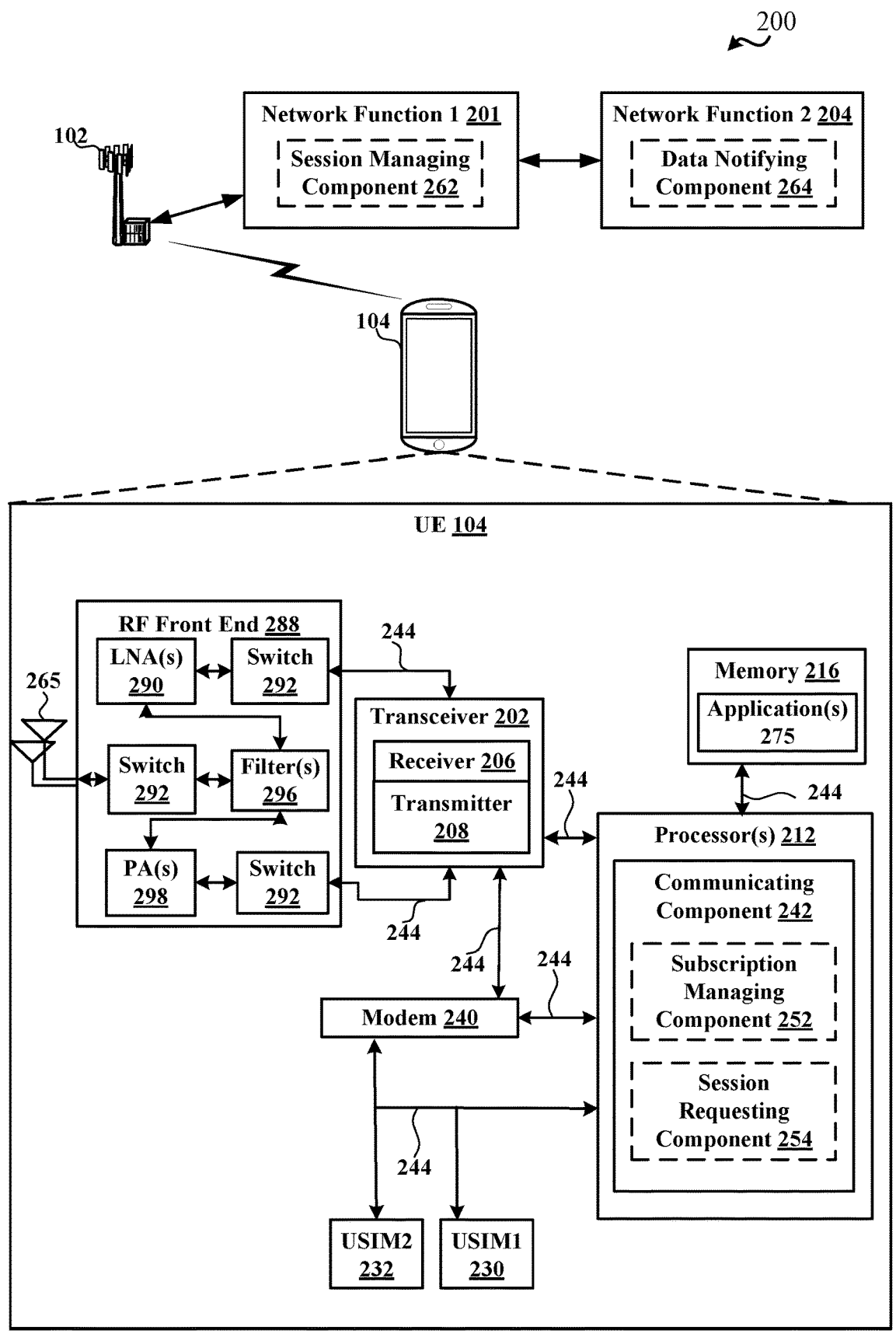
FIG. 2 is a block diagram illustrating an example of a UE, in accordance with various aspects of the present disclosure.

Referring to FIG. 2, one example of an implementation of a system 200 that includes a base station 102 and a UE 104 that communicates with the base station 102 to receive access to a first network. The first network may include a variety of components or functions (e.g., components or functions of a EPC 160 or 5GC 190, as described), such as network function 1 201 and network function 2 204. Network function 1 201 can include a AMF 192, 193 and/or SMF 194 in a 5GC 190, a MME 162 or PDN gateway 172 in a EPC 160, etc., and network function 204 can include a UPF 195 in a 5GC 190 or a PDN gateway 172 in an EPC 160. In any case, UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing one or more functions associated with requesting suspending or resuming of a data session in one or more networks, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

UE 104 can also include multiple USIMs, such as USIM1 230 and USIM2 232. For example, USIM1 230 and USIM2 232 may each relate to different networks, which may be of a same or different RAT, and may include subscription information for the given corresponding network. USIM1 230 and USIM2 232 can communicate with, or can be accessed by, modem 240 and/or processor 212 via the bus 244, in one example. UE 104 can use USIM1 230 to access a first network (e.g., the network associated with base station 102 and provided in part by network function 1 201 and network function 2 204), and can use USIM2 232 to access a second network (not shown). In one example, the UE 104 can be in an active communication state (e.g., connected mode) with the first network via USIM1 230, and can receive signals over resources from a second network via USIM2 232 at certain points in time. In this example, transceiver 202 may be tuned to other frequency resources corresponding to the second network during the certain points in time in an attempt to receive paging signals in the second network. The certain points in time may be configured as communication gaps by the first network, such that the UE 104 can receive the configuration indicating the communication gaps, and can tune away from the first network during the communication gaps in an attempt to receive paging signals from the second network.

In an aspect, communicating component 242 can optionally include a subscription managing component 252 for managing multiple subscriptions and associated communications with one or more base stations or other networks components (e.g., via USIM1 230, USIM2 232, and/or credentials corresponding to USIM1 230 and/or USIM2 232), and/or a session requesting component 254 for generating and transmitting requests related to underlying data sessions with the network. In addition, for example, network function 1 201 may include a session managing component 262 to receive and process session-related requests from the UE 104 and/or network function 2 204 may include a data notifying component 264 to control notifying of new data based on a state of the data session as potentially modified by session managing component 262.

In an aspect, the processor(s) 212 may correspond to one or more of the processors described in connection with the UE in FIG. 8. Similarly, the memory 216 may correspond to the memory described in connection with the UE in FIG. 8. In addition, network function 1 201 and/or network function 2 204 may include or be associated with devices that have processor(s) and/or memory(ies) similar to those described in connection with UE 104 to provide functionality of the described components 262, 264, but the additional processor, memory and/or other components associated with the functions 201, 204 are omitted in this Figure for ease of explanation.

Figure 3:
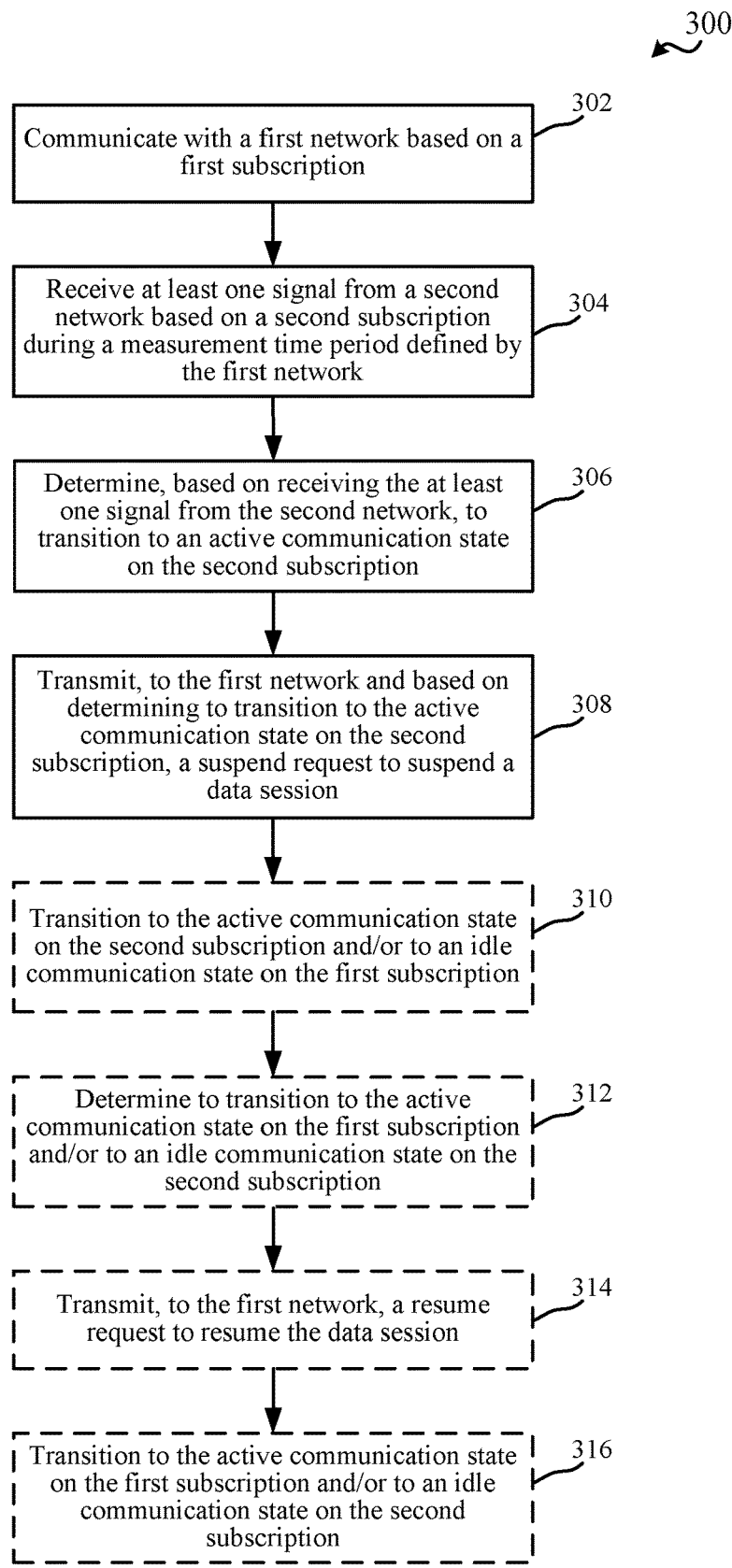
FIG. 3 is a flow chart illustrating an example of a method for requesting suspending and/or resuming of a data session, in accordance with various aspects of the present disclosure.
Figure 4:
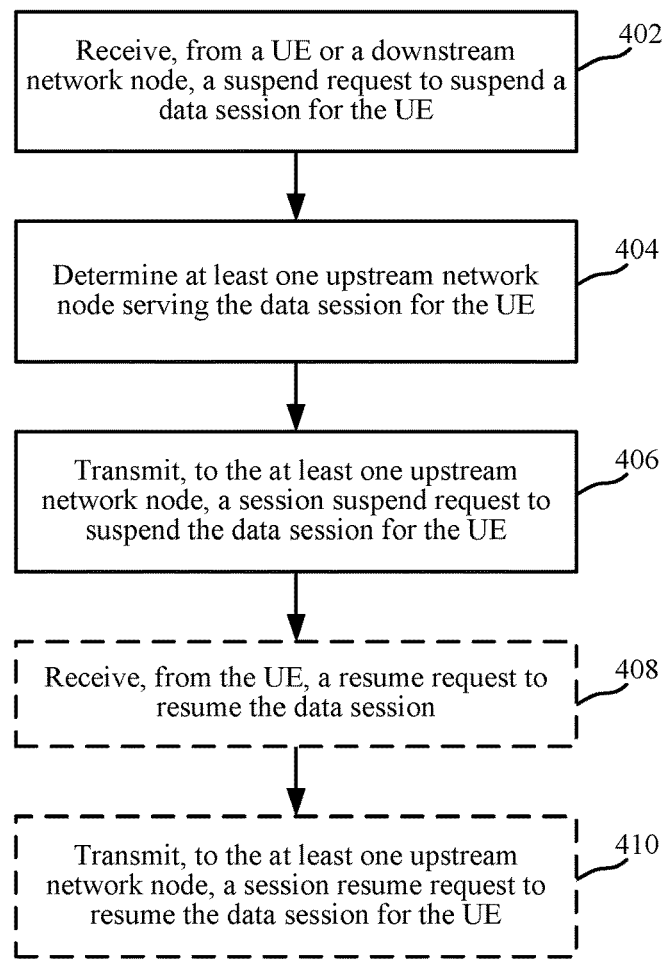
FIG. 4 is a flow chart illustrating an example of a method for processing a request for suspending and/or resuming of a data session, in accordance with various aspects of the present disclosure.
Figure 5:
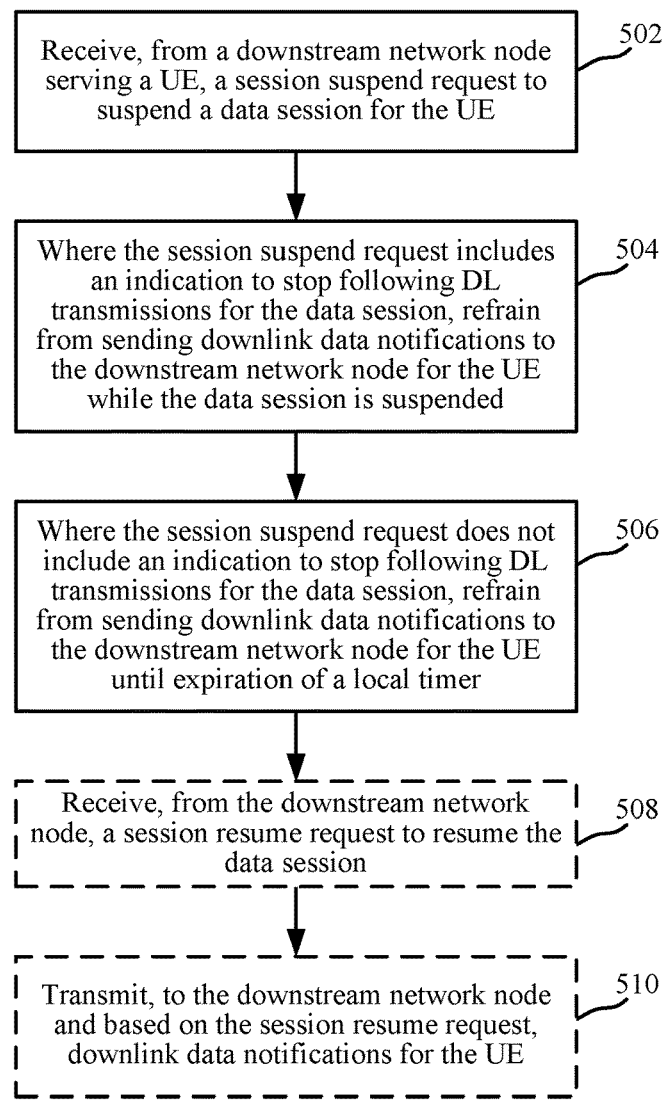
FIG. 5 is a flow chart illustrating an example of a method for determining whether to indicate new data based on processing a request for suspending and/or resuming of a data session, in accordance with various aspects of the present disclosure.

FIG. 3 illustrates a flow chart of an example of a method 300 for requesting that a data session be suspended and/or resumed for a network connection in accordance with aspects described herein. FIG. 4 illustrates a flow chart of an example of a method 400 for processing requests to suspend and/or resume data sessions for a network in accordance with aspects described herein. FIG. 5 illustrates a flow chart of an example of a method 500 for notifying of new data based on suspending and/or resume data sessions for a network in accordance with aspects described herein. Methods 300, 400, and 500 are described in conjunction with one another for ease of explanation, though the methods 300, 400, and 500 are not required to be performed in conjunction. In one example, a UE 104 can perform the functions described in method 300 using one or more of the components described in FIGS. 1 and 2, and network functions or components can perform the functions described in methods 400 and 500 using one or more of the components described in FIGS. 1 and 2, which may be provided by one or more nodes of a wireless network. The one or more nodes may include a server or other computer having a processor and/or memory configured to perform the methods 400 and/or 500, as described herein.

In method 300, at Block 302, a first network can be communicated with based on a first subscription. In an aspect, subscription managing component 252, e.g., in conjunction with processor(s) 212, memory 216, transceiver 202, communicating component 242, etc., can communicate with the first network based on the first subscription. For example, subscription managing component 252 can manage the first subscription with the first network via USIM1 230 to establish a connection therewith and communicate with the first network in an active communication state (e.g., a connected mode). In this example, subscription managing component 252 can receive resource grants from the first network (e.g., from base station 102) for receiving communications from the first network and/or transmitting communications to the first network. In addition, the first network may configure the UE 104 with communication gaps for attempting to receive signals from nodes of other networks (e.g., based on a second subscription). In an example, subscription managing component 252 can tune transceiver 202 from resources (e.g., frequency resources) associated with the first network to resources associated with a second network (not shown) in an attempt to receive paging signals on the second network. For example, the second network can correspond to a second subscription (e.g., maintained based on USIM2 232).

In method 300, at Block 304, at least one signal can be received from a second network based on a second subscription during a measurement time period defined by the first network. In an aspect, subscription managing component 252, e.g., in conjunction with processor(s) 212, memory 216, transceiver 202, communicating component 242, etc., can receive at least one signal from the second network based on the second subscription during the measurement time period defined by the first network. For example, the first network may define periodic communication gaps for attempting to receive signals of the second network. In other examples, the first network may cause the UE 104 to attempt to receive signals of the second network (e.g., based on being notified of a paging signal for the UE 104 via a backhaul link to the second network, etc.). In any case, the UE 104 can attempt to receive the paging signal, which may indicate a call, message, or other reason for the UE 104 to possibly determine to activate an active communication state on the second subscription.

In method 300, at Block 306, it can be determined, based on receiving the at least one signal from the second network, to transition to an active communication state on the second subscription. In an aspect, subscription managing component 252, e.g., in conjunction with processor(s) 212, memory 216, transceiver 202, communicating component 242, etc., can determine, based on receiving the at least one signal from the second network, to transition to the active communication state on the second subscription. For example, subscription managing component 252 can determine to transition to the active communication state to receive communications in the second network based on the second subscription (e.g., to receive a call, message, or other session). In this example, subscription managing component 252 can also determine to transition to an idle communication state on the first network to allow for using radio resources for active communication state with the second network. For example, determining to transition to the active communication state with the second network can include determining to tune frequency resources of the transceiver 202 to a frequency associated with the second network and/or to communicate with the second network based on USIM2 232 and/or credentials associated with USIM2 232.

In method 300, at Block 308, a suspend request to suspend a data session can be transmitted to the first network and based on determining to transition to the active communication state on the second subscription. In an aspect, session requesting component 254, e.g., in conjunction with processor(s) 212, memory 216, transceiver 202, communicating component 242, etc., can transmit, to the first network and based on determining to transition to the active communication state on the second subscription, the suspend request to suspend the data session. For example, the data session may be a protocol data unit (PDU) data session and may have an associated identifier. Session requesting component 254 may generate the suspend request to include the PDU session identifier, or other identifier or session information. In addition, in an example, the UE 104 may communicate using multiple sessions, and the suspend request may identify one or more of the multiple sessions for suspending. In an example, session requesting component 254 can transmit the request to the base station 102, which can forward the request to network function 1 201. As described, network function 1 201 may include a AMF, SMF, etc. of a 5GC, a MME or PDN gateway of a EPC, etc., which can forward the request to other nodes or functions in the network, as described further herein. In any case, the data session of the first network for the UE 104 can be suspended, and the UE 104 can transition to an active communication state with the second subscription without missing data from the first network/subscription.

In method 400, at Block 402, a suspend request to suspend a data session for the UE can be received from the UE or from a downstream network node. In an aspect, session managing component 262, e.g., in conjunction with network function 1 201, can receive, from the UE 104 or a downstream network node (e.g., another network function 1 201), the suspend request to suspend the data session for the UE. For example, the network function 1 201 can be a AMF, SMF, MME, PDN gateway, etc. that has a session managing component 262 that receives the request from the UE via base station 102. As described, the request may indicate one or more sessions to be suspended (e.g., based on a PDU session identifier), and/or may indicate the session identifier or other session information.

In method 400, at Block 404, at least one upstream network node serving the data session for the UE can be determined. In an aspect, session managing component 262, e.g., in conjunction with network function 1 201, can determine the at least one upstream network node serving the data session for the UE. For example, the upstream network node may include another AMF, SMF, or UPF, in 5GC, or may include another PDN gateway in EPC. In one example, session managing component 262 may identify the upstream network node based at least in part on the PDU session identifier or other session information received in the suspend request. In addition, for example, session managing component 262 can possibly determine multiple upstream network nodes for multiple sessions (e.g., all sessions of the UE, sessions indicated in the request, etc.) for suspending for the UE based on the suspend request.

In method 400, at Block 406, a session suspend request to suspend the data session for the UE can be transmitted to the at least one upstream network node. In an aspect, session managing component 262, e.g., in conjunction with network function 1 201, can transmit, to the at least one upstream network node, the session suspend request to suspend the data session for the UE. For example, where network function 1 201 is a SMF, this can include transmitting the session suspend request to a UPF. For example, where network function 1 201 is an AMF, this can include transmitting the session suspend request to another AMF or an SMF, where the other AMF or SMF can perform method 400 or a similar method 400. For example, where network function 1 201 is a control plane PDN gateway, this can include transmitting the session suspend request to a user plane PDN gateway. For example, where network function 1 201 is an MME, this can include transmitting the session suspend request to a control plane PDN gateway (e.g., via one or more other gateways or otherwise), where the control plane PDN gateway can perform method 400 or a similar method 400. In addition, in an example, session managing component 262 can transmit an acknowledgement of the suspend request to the UE 104, which can be based on receiving the suspend request based on transmitting the associated session suspend request to the upstream network node, and/or based on receiving an acknowledgement of the session suspend request from the upstream network node, etc.

Where network function 1 201 is the SMF, session managing component 262 can determine one or more parameters related to PDU session handling for the UE, which can be based on a policy from a policy control function (PCF), a subscription about data network name (DNN)/Single Network Slice Selection Assistance Information (S-NSSAI), local configuration, etc. In an example, the one or more parameter may include a session identifier or other session information of the session to be suspended, an indication of whether or not to stop downlink transmissions to the UE at least while the session is suspended, etc. For example, SMF can determine whether the UPF should suspend the PDU session and stop the following data transmission or not stop the following data transmission. Where the SMF determines the UPF should suspend the PDU session and stop the following data transmission, for example, session managing component 262 can transmit a N4 Session Modification request to the UPF including a suspend indication and can stop the following data transmission indication. Where the SMF determines the UPF should suspend the PDU session and not stop the following data transmission, for example, session managing component 262 can transmit a N4 Session Modification request to the UPF including a suspend indication.

In method 500, at Block 502, a session suspend request to suspend a data session for a UE can be received from a downstream network node serving the UE. In an aspect, data notifying component 264, e.g., in conjunction with network function 2 204, can receive, from the downstream network node serving the UE, the session suspend request to suspend the data session for the UE. For example, the network function 2 204 can be a UPF in 5GC and can receive the session suspend request from a SMF, or can be a user plane PDN gateway in EPC and receive the session suspend request from a control plane PDN gateway.

In method 500, at Block 504, sending downlink data notifications to the downstream network node for the UE can be refrained from while the data session is suspended where the session suspend request includes an indication to stop following DL transmissions for the data session. In an aspect, data notifying component 264, e.g., in conjunction with network function 2 204 can, where the session suspend request includes the indication to stop following downlink transmissions for the data session, refrain from sending the downlink data notifications to the downstream network node for the UE while the data session is suspended. For example, data notifying component 254 can refrain from sending the downlink data notifications for at least a period of time and/or until the data session is resumed. In method 500, at Block 506, sending downlink data notifications to the downstream network node for the UE can be refrained from until expiration of a local time where the session suspend request does not include an indication to stop following DL transmissions for the data session. In an aspect, data notifying component 264, e.g., in conjunction with network function 2 204 can, where the session suspend request does not include the indication to stop following downlink transmissions for the data session, refrain from sending the downlink data notifications to the downstream network node for the UE until expiration of a local timer.

For example, where network function 2 204 is the UPF, data notifying component 264 can determine whether the session suspend request includes the indication to stop following downlink transmissions. Where it does, data notifying component 264 can refrain from sending downlink data notifications to the SMF for the UE at least while the data session is suspended, and thus the SMF does not send paging signals to the UE. Where the session suspend request does not include the indication to stop following downlink transmissions, data notifying component 264 may at least suspend downlink transmission for a period of time. For example, data notifying component 264 can initialize a local timer, and can refrain from sending downlink data notifications to the SMF for the UE until the timer expires (e.g., regardless of whether the UE has requested that the data session be resumed). In this regard, in an example, the SMF can initiate a paging procedure toward the UE after the timer expires. Moreover, in an example, the network function 2 204 can transmit a session suspend request acknowledgement to the network function 1 201 indicating that the request has been received or processed.

In method 300, optionally at Block 310, the active communication state can be transitioned to on the second subscription and/or an idle communication state can be transitioned to on the first subscription. In an aspect, subscription managing component 252, e.g., in conjunction with processor(s) 212, memory 216, transceiver 202, communicating component 242, etc., can transition to the active communication state on the second subscription and/or to the idle communication state on the first subscription. In an example, subscription managing component 252 can transition between states based on receiving a suspend request acknowledgement from the network function 1 201. For example, subscription managing component 252 can request the transition between states via RRC signaling to appropriate nodes in the networks. Where subscription managing component 252 requests transition to an active communication state with the second network, and/or based on transitioning to the active communication state with the second network, subscription managing component 252 can receive communications from the second network. For example, transitioning to the active communication state with the second network can include tuning transceiver 202 to an operating frequency of the second network and/or receiving scheduling grants for communicating with the second network.

In addition, in an example, where subscription managing component 252 requests transition to an idle communication state with the first network, and/or based on based on transitioning to the idle communication state with the first network, subscription managing component 252 may attempt to receive paging signals from the first network in communication gaps configured in the second network for possibly determining to transition back to an active communication state on the first network. For example, transitioning to the idle communication state with the first network can include determining communication gaps defined in a configuration (e.g., from the second network) for tuning the transceiver 202 to the first network for receiving paging signals in the first network.

In an example, optionally at Block 312, it can be determined to transition to the active communication state on the first subscription and/or to an idle communication state on the second subscription. In an aspect, subscription managing component 252, e.g., in conjunction with processor(s) 212, memory 216, transceiver 202, communicating component 242, etc., can determine to transition to the active communication state on the first subscription and/or to the idle communication state on the second subscription. For example, subscription managing component 252 can determine to transition states based on receiving a paging signal in the first network, based on detecting occurrence of another event, such as determining a call on the second subscription has terminated, etc.

In addition, optionally at Block 314, a resume request to resume the data session can be transmitted to the first network. In an aspect, session requesting component 254, e.g., in conjunction with processor(s) 212, memory 216, transceiver 202, communicating component 242, etc., can transmit, to the first network, the resume request to resume the data session, which can be based on determining to transition to the active communication state with the first network (e.g., based on receiving a paging signal or other event). For example, session requesting component 254 can transmit, to the first network, the resume request to resume the data session based on determining to transition to the active communication state in the first network.

In method 400, optionally at Block 408, a resume request to resume the data session can be received from the UE. In an aspect, session managing component 262, e.g., in conjunction with network function 1 201, can receive, from the UE 104 or a downstream network node (e.g., another network function 1 201), the resume request to resume the data session for the UE. For example, the network function 1 201 can be a AMF, SMF, MME, PDN gateway, etc. that has a session managing component 262 that receives the request from the UE via base station 102. The request may indicate one or more sessions to be resumed (e.g., based on a PDU session identifier and/or other session information).

In method 400, optionally at Block 410, a session resume request to resume the data session for the UE can be transmitted to the at least one upstream network node. In an aspect, session managing component 262, e.g., in conjunction with network function 1 201, can transmit, to the at least one upstream network node, the session resume request to resume the data session for the UE. For example, where network function 1 201 is a SMF, this can include transmitting the session resume request to a UPF. For example, where network function 1 201 is an AMF, this can include transmitting the session resume request to another AMF or an SMF, where the other AMF or SMF can perform method 400 or a similar method 400. For example, where network function 1 201 is a control plane PDN gateway, this can include transmitting the session resume request to a user plane PDN gateway. For example, where network function 1 201 is an MME, this can include transmitting the session resume request to a control plane PDN gateway (e.g., via one or more other gateways or otherwise), where the control plane PDN gateway can perform method 400 or a similar method 400. In addition, session managing component 262 can transmit an acknowledgement of the resume request to the UE 104, which can be based on receiving the resume request based on transmitting the associated session resume request to the upstream network node, and/or based on receiving an acknowledgement of the session resume request from the upstream network node, etc. Where a local timer is used in suspending the data session, as described above, session managing component 262 can stop the local timer.

In method 500, optionally at Block 508, a session resume request to resume a data session for a UE can be received from a downstream network node serving the UE. In an aspect, data notifying component 264, e.g., in conjunction with network function 2 204, can receive, from the downstream network node serving the UE, the session resume request to resume the data session for the UE. For example, the network function 2 204 can be a UPF in 5GC and can receive the session resume request from a SMF. In another example, the network function 2 204 can be a user plane PDN gateway in EPC and can receive the session resume request from a control plane PDN gateway.

In method 500, optionally at Block 510, downlink data notifications for the UE can be transmitted to the downstream network node and based on the session resume request. In an aspect, data notifying component 264, e.g., in conjunction with network function 2 204, can transmit, to the downstream network node and based on the session resume request, downlink data notifications for the UE. For example, where the network function 2 204 is a UPF, data notifying component 264 can send downlink data notifications to the SMF for providing to the UE 104. For example, the downlink data notifications can indicate existence of downlink data for the UE 104, and the SMF can causing sending of a paging signal to the UE 104, etc. for receiving the data.

In method 300, optionally at Block 316, the active communication state can be transitioned to on the first subscription and/or an idle communication state can be transitioned to on the second subscription. In an aspect, subscription managing component 252, e.g., in conjunction with processor(s) 212, memory 216, transceiver 202, communicating component 242, etc., can transition to the active communication state on the first subscription and/or to the idle communication state on the second subscription. In an example, subscription managing component 252 can transition between states based on receiving a resume request acknowledgement from the network function 1 201. For example, subscription managing component 252 can request the transition between states via RRC signaling to appropriate nodes in the networks. Where subscription managing component 252 requests transition to an active communication state with the first network, and/or based on transitioning to the active communication state with the first network, subscription managing component 252 can receive communications from the first network, as described. For example, transitioning to the active communication state with the first network can include tuning transceiver 202 to an operating frequency of the first network and/or receiving scheduling grants for communicating with the first network.

In addition, in an example, where subscription managing component 252 requests transition to an idle communication state with the second network, and/or based on based on transitioning to the idle communication state with the second network, subscription managing component 252 may attempt to receive paging signals from the second network in communication gaps configured in the first network for possibly determining to transition back to an active communication state on the second network, as described. For example, transitioning to the idle communication state with the second network can include determining communication gaps defined in a configuration (e.g., from the first network) for tuning the transceiver 202 to the second network for receiving paging signals in the second network.

Figure 6:
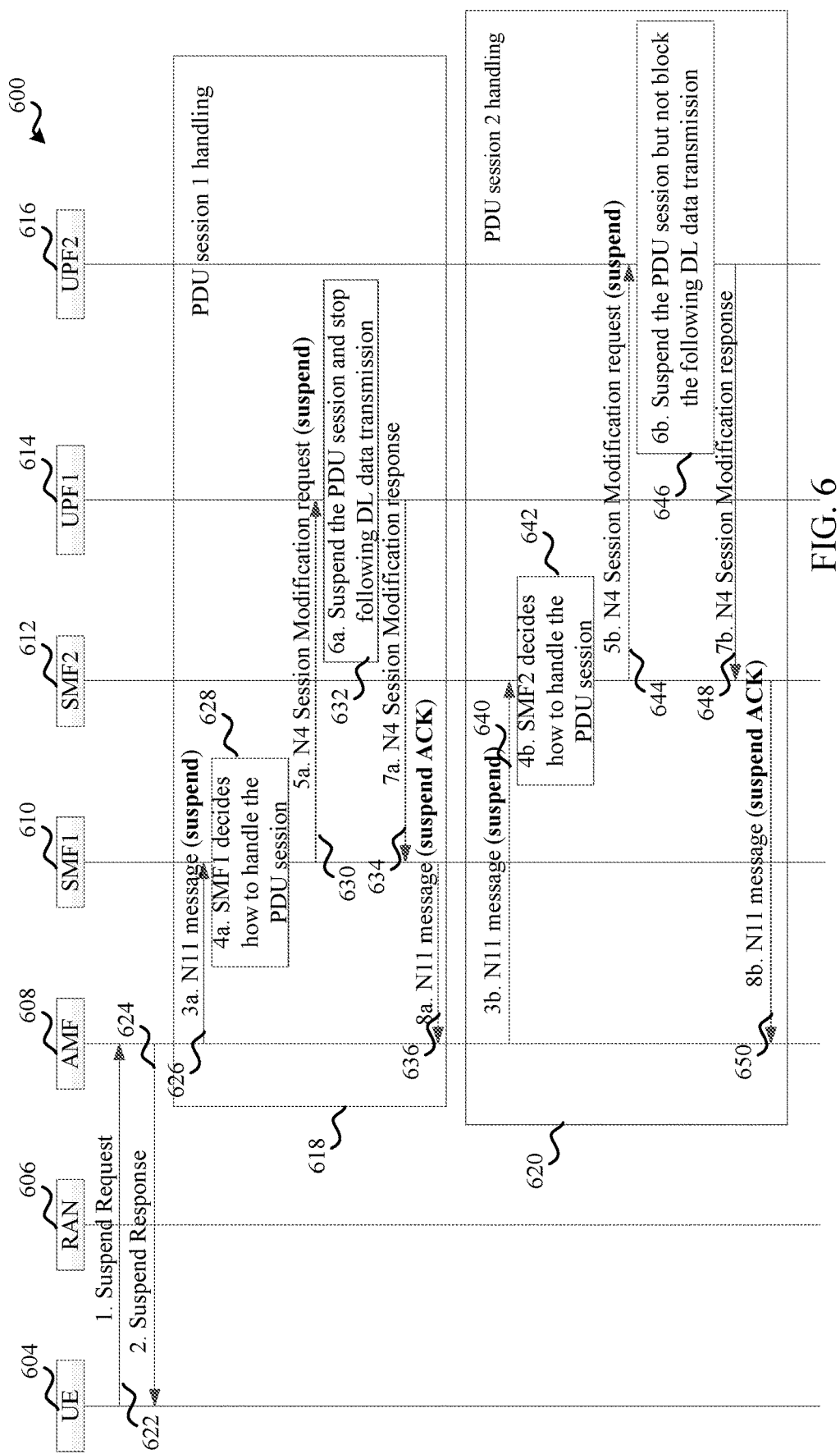
FIG. 6 illustrates an example of a system for requesting suspending of a data session, in accordance with various aspects of the present disclosure.

FIG. 6 illustrates an example of a system 600 for performing a non-access stratum (NAS) layer suspend procedure. System 600 includes a UE 604 for requesting suspending of a data session, a radio access network 606 (e.g., including one or more base stations, a radio network controller, etc.) that interfaces with a 5GC or EPC, and one or more core network nodes, such as a AMF 608, SMF1 610, SMF2 612, UPF1 614, and/or UPF2 616. In this example, SMF1 610 and SMF2 612 may exist in the alternative and may be used to perform PDU session 1 handling 618 and PDU session 2 handling 620 options respectively. Similarly, UPF1 614 and UPF2 616 may exist in the alternative and may be used to perform PDU session 1 handling 618 and PDU session 2 handling 620 options respectively.

In an example, UE 604 can determine to send the NAS suspend request 622 to AMF 608 associated with the first of the subscriptions when determines to respond to a paging signal on a second subscription. Optionally, UE 604 may include the PDU session ID that requested to suspend in the NAS suspend request 622. AMF 608 can send a suspend response 624 to the UE 604 indicating that the suspend request 622 is received. AMF 608 can send the suspend request in a N11 message 626 to the SMFs that served for the USIM or related credentials/identifiers, e.g., SMF1 610, via N11 signaling. If PDU session ID(s) are included in the NAS Suspend request 622, AMF sends the N11 message 626 to the SMF(s) that served for the PDU session ID(s). In one example, if UE 604 does not include the PDU session ID in the NAS Suspend request 622, AMF 608 can send the N11 message 626 to all the SMFs that served for the USIM.

SMF1 610 can decide how to handle the PDU session which can be based on the policy information, subscription information, local configuration, etc., as described. For example, SMF1 610 may request to stop DL data transmission until a resume message is received, or SMF1 610 may request to stop DL data transmission for a period of time (e.g., based on a timer duration) and after the period of time (e.g., based on detecting timer expiration), the DL data transmission can be allowed and accordingly transmitted if available.

As described, USIM A of the UE 604 sends the NAS suspend request 622 to the AMF 608, before UE 604 establishes signaling connection to USIM B network. UE 604 may include the PDU session ID that requested to suspend in the NAS suspend request 622. AMF 608 can send the NAS suspend response 624 to UE 604. In the example of PDU session 1 handling 618, AMF 608 sends the N11 message to the SMF(s) that served for USIM A, such as SMF1 610. If PDU session ID(s) are included in the NAS Suspend request 622, AMF 608 sends the suspend message to the SMF(s) that served for the PDU session ID(s). In one example, if UE 604 does not include the PDU session ID in the NAS Suspend request 622, AMF 608 can send the suspend message to all the SMFs that served for the USIM. SMF1 618 can decide how to handle the PDU session for suspend.

SMF1 610 may decide the PDU session handling based on the policy from PCF, the subscription about DNN/S-NSSAI or local configuration. UPF1 614 can suspend the PDU session and stop the following data transmission. SMF1 618 can send the N4 Session Modification request to UPF1 614, the N4 Session Modification request can include suspend indication and stop the following DL data transmission indication to UPF1 614. UPF1 614 can suspend the PDU session, stop DL data transmission to the PDU session. If downlink data arrives, UPF1 614 can stop sending Downlink data notification to SMF1 610 to trigger paging USIM A if there is no available N3 tunnel for the PDU session, or UPF1 616 can stop sending DL data to RAN if there is available N3 tunnel for the PDU session. UPF1 614 can send the N4 Session Modification response message to SMF1 610. SMF1 610 can send the suspend ACK message to AMF 608.

In PDU session 2 handling 620, for example, UPF2 616 can suspend the PDU session but not stop the following DL data transmission. In this example, SMF2 612 can send the N4 Session Modification request to UPFs, e.g., UPF2 616, the N4 Session Modification request can include suspend indication. UPF2 616 can suspend the PDU session, and/or stop DL data transmission for the PDU session. UPF2 616 may activate a local timer, and during the local timer activation (e.g., before the local timer expires), UPF2 616 may not be allowed to send the DL data. After the local timer expiration, UPF2 616 may be allowed to transmit the DL data. If there is no available N3 tunnel for the PDU session, UPF2 616 may send the Downlink data notification to SMF2 612 to initiate paging procedure. If there is available N3 tunnel for the PDU session, UPF2 616 can send the DL data to RAN 606. UPF2 616 can send the PDU Session Modification response message to SMF2 612. SMF2 612 can send the suspend ACK message to AMF 608. The similar logic and/or messages can be used for UEs connecting to LTE system. For example, the AMF 608 can be an MME and the SMF1 610 and SMF2 612 can be PGW-C1 and PGW-C2 respectively. The UPF1 614 and UPF2 616 can be PGW-U1 and PGW-U2 respectively.

Figure 7:
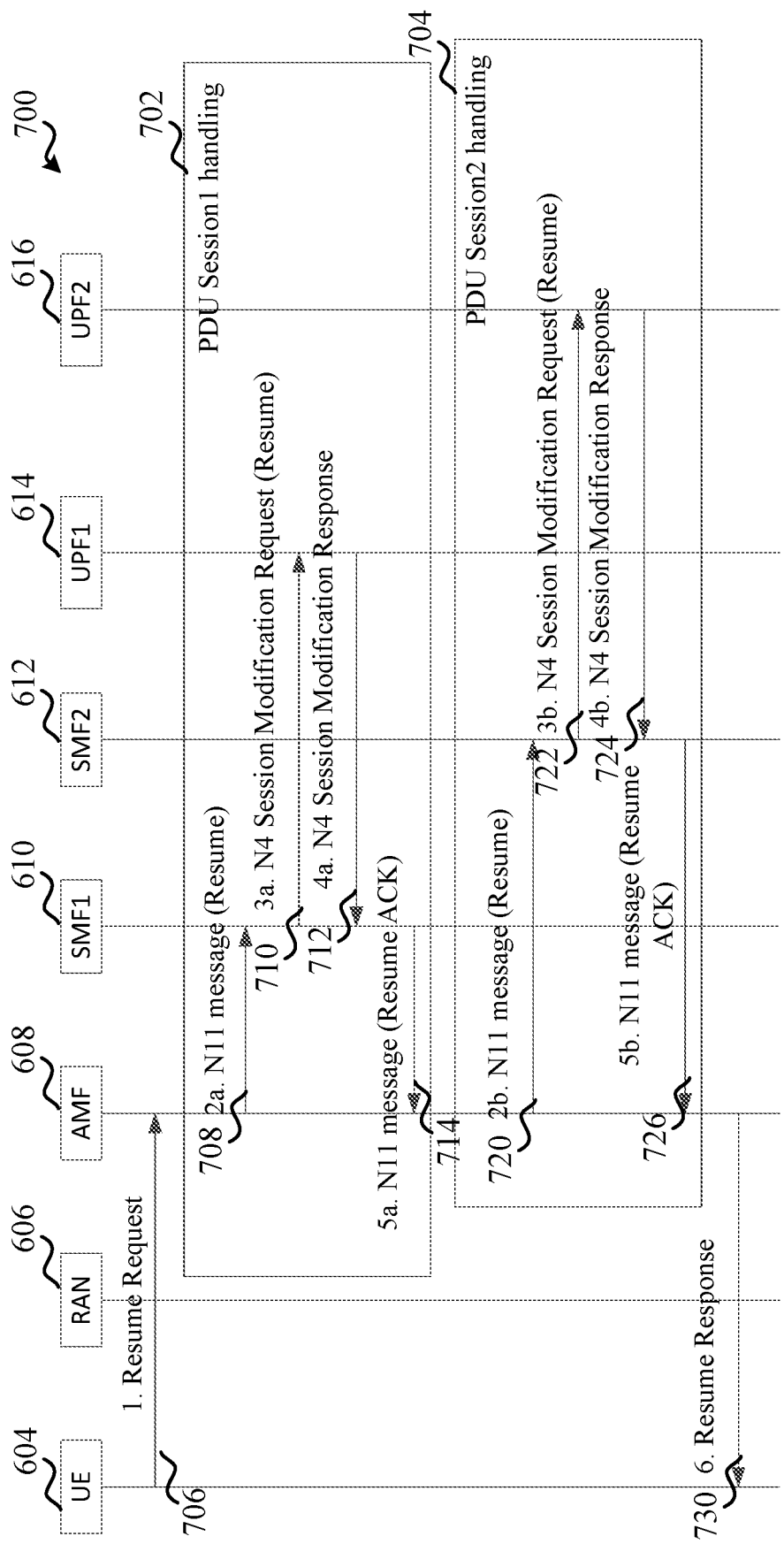
FIG. 7 illustrates an example of a system for requesting resuming of a data session, in accordance with various aspects of the present disclosure.

FIG. 7 illustrates an example of a system 700 where a UE determines to send the NAS resume message to AMF associated with the first of the subscriptions when the second subscription enters RRC-IDLE/RRC-inactive mode and UE wants to resume the PDU sessions associated with the first subscription. In this example, UE 604 initiates a NAS Resume Request 706 to AMF 608. In the example of PDU session 1 handling 702, AMF 608 can send N11 message 708 which includes Resume information to the SMF(s) that served USIM A, such as SMF1 610. SMF1 610 can send N4 Session Modification Request (Resume) to UPF1 614. UPF 614 can recover the DL data transmission if DL data transmission was blocked in the Suspend procedure. UPF1 614 can send the N4 Session Modification Response message to SMF1 610. SMF1 610 can send ACK to AMF 608 on N11 interface.

In the example, of PDU session 2 handling 704, SMF2 612 can send N4 Session Modification Request (Resume) to UPF2 616. If a local timer, described in the example of FIG. 6 above, is activated, UPF2 616 can stop the local timer and recover the DL data transmission for the PDU session. UPF2 616 can send the N4 Session Modification Response message to SMF2 612. SMF2 612 can send ACK to AMF 608 on N11 interface. AMF 608 can send Resume response to USIM A. In this example as well, similar logic can be used for UEs connecting to LTE system. For example, the AMF 608 can be an MME and the SMF1 610 and SMF2 612 can be PGW-C1 and PGW-C2 respectively. The UPF1 614 and UPF2 616 can be PGW-U1 and PGW-U2 respectively. Once the session is resumed, UPF2 616, SMF2 612, and/or AMF 608 can transmit recovered downlink to the UE 604.

Figure 8:
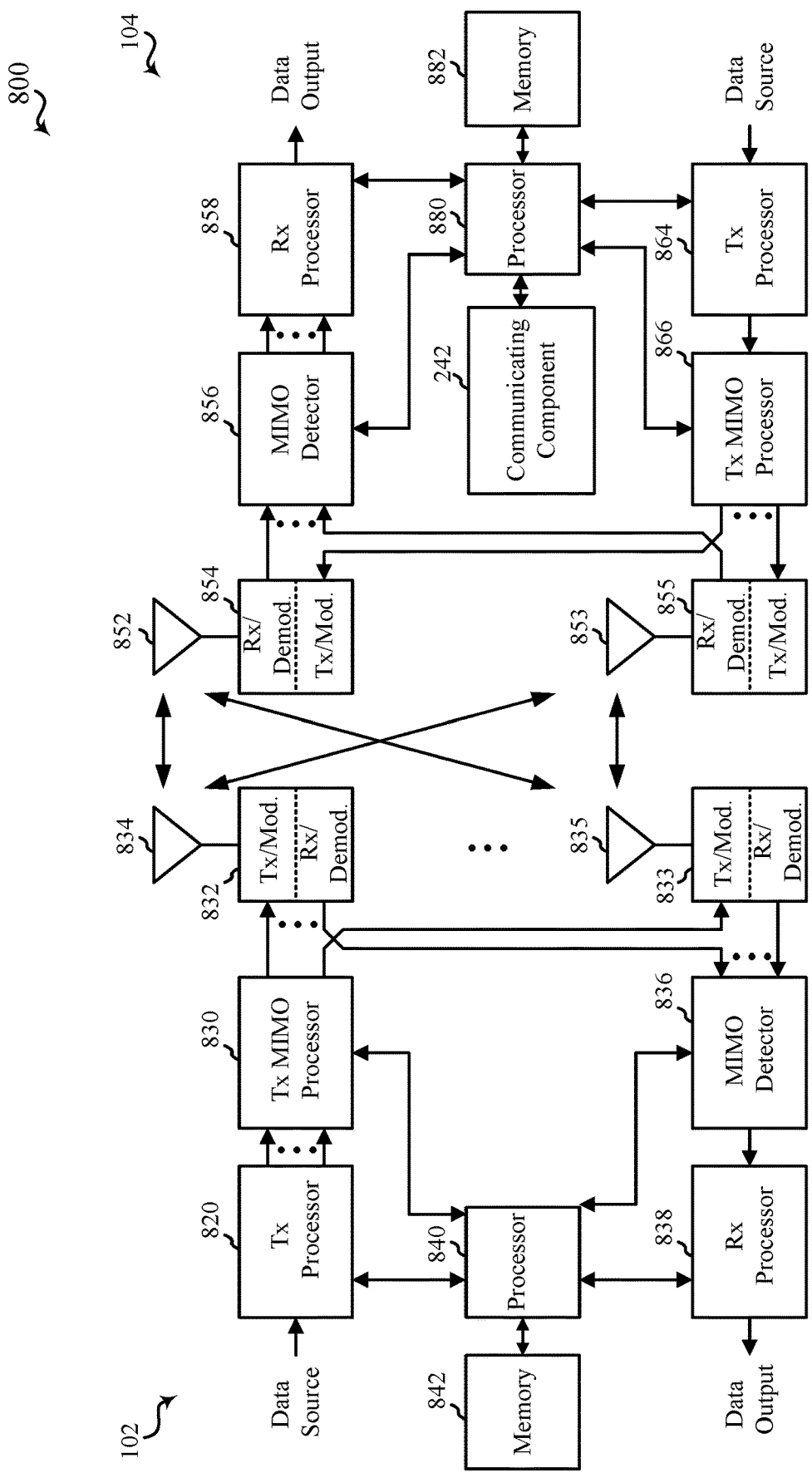
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

SOME FURTHER EXAMPLES

In one example, a method for wireless communication includes communicating with a first network based on a first subscription, receiving at least one signal from a second network based on a second subscription during a measurement time period defined by the first network, determining, based on receiving the at least one signal from the second network, to transition to an active communication state on the second subscription, and transmitting, to the first network and based on determining to transition to the active communication state on the second subscription, a suspend request to suspend a data session.

One or more of the above examples can further include transitioning to the active communication state on the second subscription.

One or more of the above examples can further include receiving a response to the suspend request to suspend the data session, wherein the response confirms suspending of the data session with the first network, and wherein transitioning to the active communication state on the second subscription is based at least in part on receiving the response.

One or more of the above examples can further include wherein receiving the at least one signal from the second network comprises receiving at least one paging signal from the second network.

One or more of the above examples can further include wherein transmitting the suspend request to suspend the data session comprises transmitting the suspend request to a mobility management entity (MME) in long term evolution (LTE) or an access and mobility management function (AMF) in new radio (NR).

One or more of the above examples can further include generating the suspend request to include a session identifier for the data session.

One or more of the above examples can further include transmitting, to the first network, a resume request to resume the data session.

One or more of the above examples can further include transitioning to an idle state in the second subscription, wherein transmitting the resume request is based at least in part on transitioning to the idle state.

One or more of the above examples can further include wherein transmitting the resume request comprises transmitting the resume request to a mobility management entity (MME) in long term evolution (LTE) or an access and mobility management function (AMF) in new radio (NR).

One or more of the above examples can further include generating the resume request to include a session identifier for the data session.

In one example, a method for wireless communication includes receiving, from a user equipment (UE) or a downstream network node, a suspend request to suspend a data session for the UE, determining an upstream network node serving the data session for the UE, and transmitting, to the upstream network node, a session suspend request to suspend the data session for the UE.

One or more of the above examples can further include wherein the session suspend request indicates a session identifier, and further comprising determining the upstream network node based at least in part on the session identifier.

One or more of the above examples can further include wherein the upstream network node is a packet data network (PDN) gateway (PGW) in long term evolution (LTE) or a session management function (SMF) in new radio (NR).

One or more of the above examples can further include determining one or more additional upstream network nodes serving other data sessions for the UE, and transmitting, to the one or more additional upstream network nodes and based on receiving the suspend request, one or more additional session suspend requests.

One or more of the above examples can further include generating the session suspend request based at least in part on at least one of policy information, subscription of data network name (DNN)/Single Network Slice Selection Assistance Information (S-NSSAI), or a local configuration.

One or more of the above examples can further include wherein the session suspend request further includes an indication to stop following downlink data transmissions for the data session.

One or more of the above examples can further include wherein the upstream network node is a packet data network (PDN) gateway (PGW) in long term evolution (LTE) or a user plane function (UPF) in new radio (NR).

One or more of the above examples can further include wherein the session suspend request includes a N4 modification request.

One or more of the above examples can further include receiving, from the UE, a resume request to resume the data session, and transmitting, to the upstream network node, a session resume request to resume the data session for the UE.

One or more of the above examples can further include wherein the session resume request includes a N4 modification request.

In one example, a method for wireless communication includes receiving, from a downstream network node serving a user equipment (UE), a session suspend request to suspend a data session, where the session suspend request includes an indication to stop following downlink data transmissions for the data session, refraining from sending downlink data notifications to the downstream network node for the UE while the data session is suspended, and where the session suspend request does not include an indication to stop following downlink data transmissions for the data session, refraining from sending downlink data notifications to the downstream network node for the UE until expiration of a local timer.

One or more of the above examples can further include wherein refraining from sending downlink data notifications to the downstream network node comprises refraining from sending downlink data to the downstream network node.

One or more of the above examples can further include wherein refraining from sending downlink data notifications to the downstream network node comprises refraining from sending paging messages to the UE.

One or more of the above examples can further include wherein after expiration of the local timer, further comprising sending downlink data notifications comprises requesting initiation of a paging procedure with the downstream network node for the UE.

One or more of the above examples can further include receiving, from the downstream network node, a session resume request to resume the data session, and transmitting, to the downstream network node and based on the session resume request, downlink data notifications for the UE.

An example apparatus includes a transceiver, a memory configured to store instructions, and one or more processors communicatively coupled with the transceiver and the memory, wherein the one or more processors are configured to perform all or part of one or more of the above example methods.

An example apparatus includes means for performing all or part of one or more of the above example methods.

A computer-readable medium includes code executable by one or more processors for wireless communications, the code including code for performing all or part of one or more of the above example methods.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   communicating with a first network based on a first subscription;
   receiving at least one signal from a second network based on a second subscription during a measurement time period defined by the first network;
   determining, based on receiving the at least one signal from the second network, to transition to an active communication state on the second subscription;
   transmitting, to the first network and based on determining to transition to the active communication state on the second subscription, a suspend request to suspend a data session;
   receiving paging signals from the first network in communication gaps configured in the second network for determining whether to transition back to an active communication state on the first network; and
   transmitting, to the first network, a resume request to resume the data session based on receiving the paging signals based on determining to transition back to an active communication state on the first network.

2. The method of claim 1, wherein receiving the at least one signal from the second network comprises receiving at least one paging signal from the second network.

3. The method of claim 1, further comprising generating the suspend request to include a session identifier for the data session.

4. The method of claim 1, further comprising transitioning to an idle state in the second subscription, wherein transmitting the resume request is based at least in part on transitioning to the idle state.

5. The method of claim 1, further comprising generating the resume request to include a session identifier for the data session.

6. The method of claim 1, further comprising transitioning to the active communication state on the second subscription.

7. The method of claim 6, further comprising receiving a response to the suspend request to suspend the data session, wherein the response confirms suspending of the data session with the first network, and wherein transitioning to the active communication state on the second subscription is based at least in part on receiving the response.

8. The method of claim 1, wherein transmitting the suspend request to suspend the data session comprises transmitting the suspend request to a mobility management entity (MME) in long term evolution (LTE) or an access and mobility management function (AMF) in new radio (NR).

9. The method of claim 1, wherein transmitting the resume request comprises transmitting the resume request to a mobility management entity (MME) in long term evolution (LTE) or an access and mobility management function (AMF) in new radio (NR).

10. An apparatus for wireless communication, comprising:
    a transceiver;
    a memory configured to store instructions; and
    one or more processors communicatively coupled with the transceiver and the memory, wherein the one or more processors are configured to:
        communicate with a first network based on a first subscription;
        receive at least one signal from a second network based on a second subscription during a measurement time period defined by the first network;
        determine, based on receiving the at least one signal from the second network, to transition to an active communication state on the second subscription;
        transmit, to the first network and based on determining to transition to the active communication state on the second subscription, a suspend request to suspend a data session;
        receive paging signals from the first network in communication gaps configured in the second network for determining whether to transition back to an active communication state on the first network; and
        transmit, to the first network, a resume request to resume the data session based on receiving the paging signals based on determining to transition back to an active communication state on the first network.

11. The apparatus of claim 10, wherein the one or more processors are configured to receive at least one paging signal from the second network.

12. The apparatus of claim 10, wherein the one or more processors are further configured to generate the suspend request to include a session identifier for the data session.

13. The apparatus of claim 10, wherein the one or more processors are further configured to transition to an idle state in the second subscription, wherein the one or more processors are configured to transmit the resume request based at least in part on transitioning to the idle state.

14. The apparatus of claim 10, wherein the one or more processors are further configured to generate the resume request to include a session identifier for the data session.

15. The apparatus of claim 10, wherein the one or more processors are further configured to transition to the active communication state on the second subscription.

16. The apparatus of claim 15 wherein the one or more processors are further configured to receive a response to the suspend request to suspend the data session, wherein the response confirms suspending of the data session with the first network, and wherein the one or more processors are configured to transition to the active communication state on the second subscription is based at least in part on receiving the response.

17. The apparatus of claim 10, wherein the one or more processors are configured to transmit the suspend request to a mobility management entity (MME) in long term evolution (LTE) or an access and mobility management function (AMF) in new radio (NR).

18. The apparatus of claim 10, wherein the one or more processors are configured to transmit the resume request to a mobility management entity (MME) in long term evolution (LTE) or an access and mobility management function (AMF) in new radio (NR).

19. An apparatus for wireless communication, comprising:
   means for communicating with a first network based on a first subscription;
   means for receiving at least one signal from a second network based on a second subscription during a measurement time period defined by the first network;
   means for determining, based on receiving the at least one signal from the second network, to transition to an active communication state on the second subscription;
   means for transmitting, to the first network and based on determining to transition to the active communication state on the second subscription, a suspend request to suspend a data session;
   means for receiving paging signals from the first network in communication gaps configured in the second network for determining whether to transition back to an active communication state on the first network; and
   means for transmitting, to the first network, a resume request to resume the data session based on receiving the paging signals based on determining to transition back to an active communication state on the first network.

20. The apparatus of claim 19, wherein the means for receiving receives at least one paging signal from the second network.

21. The apparatus of claim 19, further comprising means for generating the suspend request to include a session identifier for the data session.

22. The apparatus of claim 19, further comprising means for transitioning to an idle state in the second subscription, wherein the means for transmitting the resume request transmits the resume request based at least in part on transitioning to the idle state.

23. The apparatus of claim 19, further comprising means for transitioning to the active communication state on the second subscription.

24. The apparatus of claim 23, further comprising means for receiving a response to the suspend request to suspend the data session, wherein the response confirms suspending of the data session with the first network, and wherein the means for transitioning transitions to the active communication state on the second subscription based at least in part on receiving the response.

25. A non-transitory computer-readable medium, comprising code executable by one or more processors for wireless communications, the code comprising code for:
   communicating with a first network based on a first subscription;
   receiving at least one signal from a second network based on a second subscription during a measurement time period defined by the first network;
   determining, based on receiving the at least one signal from the second network, to transition to an active communication state on the second subscription;
   transmitting, to the first network and based on determining to transition to the active communication state on the second subscription, a suspend request to suspend a data session;
   receiving paging signals from the first network in communication gaps configured in the second network for determining whether to transition back to an active communication state on the first network; and
   transmitting, to the first network, a resume request to resume the data session based on receiving the paging signals based on determining to transition back to an active communication state on the first network.

26. The non-transitory computer-readable medium of claim 25, wherein the code for receiving receives at least one paging signal from the second network.

27. The non-transitory computer-readable medium of claim 25, further comprising means for generating the suspend request to include a session identifier for the data session.

28. The non-transitory computer-readable medium of claim 25, further comprising means for transitioning to an idle state in the second subscription, wherein the means for transmitting the resume request transmits the resume request based at least in part on transitioning to the idle state.

29. The non-transitory computer-readable medium of claim 25, further comprising code for transitioning to the active communication state on the second subscription.

30. The non-transitory computer-readable medium of claim 29, further comprising code for receiving a response to the suspend request to suspend the data session, wherein the response confirms suspending of the data session with the first network, and wherein the code for transitioning transitions to the active communication state on the second subscription based at least in part on receiving the response.

* * * * *